US011232731B2

(12) United States Patent
Lee et al.

(10) Patent No.: US 11,232,731 B2
(45) Date of Patent: Jan. 25, 2022

(54) FOLDABLE DISPLAY DEVICE

(71) Applicant: LG Display Co., Ltd., Seoul (KR)

(72) Inventors: JooHee Lee, Paju-si (KR); Jin Jeon, Daejeon (KR); DaeSeok Oh, Paju-si (KR); Jinwoo Jung, Suncheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/122,198

(22) Filed: Dec. 15, 2020

(65) Prior Publication Data

US 2021/0201725 A1 Jul. 1, 2021

(30) Foreign Application Priority Data

Dec. 26, 2019 (KR) ........................ 10-2019-0175311

(51) Int. Cl.
*G06F 3/00* (2006.01)
*G09G 3/00* (2006.01)

(52) U.S. Cl.
CPC ....... *G09G 3/035* (2020.08); *G09G 2310/027* (2013.01); *G09G 2320/0276* (2013.01); *G09G 2360/04* (2013.01); *G09G 2380/02* (2013.01)

(58) Field of Classification Search
CPC ........... G09G 3/035; G09G 2320/0276; G09G 2380/02; G09G 2360/04; G09G 2310/027
See application file for complete search history.

(56) References Cited

U.S. PATENT DOCUMENTS

2016/0313846 A1* 10/2016 Hong .................... G06F 3/0412
2018/0061344 A1* 3/2018 Kurokawa ........... G09G 3/3648

FOREIGN PATENT DOCUMENTS

KR 10-2012-0052535 A 5/2012

* cited by examiner

*Primary Examiner* — Michael A Faragalla
(74) *Attorney, Agent, or Firm* — Fenwick & West LLP

(57) ABSTRACT

According to an aspect of the present disclosure, a foldable display device includes a display panel including a plurality of display areas divided by a folding line; and a data integrated circuit outputting a data voltage to the plurality of display areas, wherein the data integrated circuit includes a timing controller outputting a gamma enable signal; a data processor processing an image data; a gamma voltage generator determining whether or not to output a plurality of gamma voltages according to the gamma enable signal; and a digital analog converter (DAC) outputting the gamma voltage, as the data voltage corresponding to a gray value of the image data.

15 Claims, 7 Drawing Sheets

FOLDABLE DISPLAY DEVICE

CROSS-REFERENCE TO RELATED APPLICATIONS

This application claims the priority benefit of Republic of Korea Patent Application No. 10-2019-0175311 filed on Dec. 26, 2019, in the Korean Intellectual Property Office, the disclosure of which is incorporated by reference in its entirety.

BACKGROUND

Technical Field

The present disclosure relates to a foldable display device, and more particularly, to a foldable display device capable of driving a plurality of divided display areas and a driving method for the foldable display device.

Description of the Related Art

Display devices used for a computer monitor, a TV, and a mobile phone include an electroluminescence display device that emits light by itself, a liquid crystal display (LCD) device that requires a separate light source, and the like.

Such display devices are being applied to more and more various fields including not only a computer monitor and a TV, but personal mobile devices, and thus, display devices having a reduced volume and weight while having a wide display area are being studied.

Recently, a foldable display device that can be freely folded and unfolded by forming a display unit, lines, and the like on a flexible substrate has attracted attention as a next-generation display device.

SUMMARY

A foldable display device includes a display panel having flexibility so that it is foldable, and a plurality of data integrated circuits (D-IC) for driving the display panel. When folding the foldable display device, a display area may be separated into a plurality of display areas by the folding. And, a portion of the separated plurality of display areas may not need to implement an image. Accordingly, when the portion of the display areas which is unnecessary to implement an image is driven, all components of the data integrated circuits are driven even though all components of the data integrated circuits need not be driven, thereby resulting in waste of power consumption.

Accordingly, a structure and method for reducing power consumption in a foldable display device is disclosed.

Accordingly, a foldable display device capable of optimizing power consumption of a data integrated circuit when driving a display area which is unnecessary to implement an image is disclosed.

An object of the present disclosure is to provide a foldable display device capable of controlling a gamma voltage generator of a data integrated circuit.

An object to be achieved by the present disclosure is to provide a foldable display device capable of minimizing a deviation of data voltages output from a plurality of data integrated circuits.

Objects of the present disclosure are not limited to the above-mentioned objects, and other objects, which are not mentioned above, can be clearly understood by those skilled in the art from the following descriptions.

According to an aspect of the present disclosure, a foldable display device includes a display panel including a plurality of display areas divided by a folding line; and a data integrated circuit outputting a data voltage to the plurality of display areas, wherein the data integrated circuit includes a timing controller outputting a gamma enable signal; a data processor processing an image data; a gamma voltage generator determining whether or not to output a plurality of gamma voltages according to the gamma enable signal; and a digital analog converter (DAC) outputting the gamma voltage, as the data voltage corresponding to a gray value of the image data.

Other detailed matters of the exemplary embodiments are included in the detailed description and the drawings.

According to the present disclosure, when a non-display area is driven, power consumption can be significantly reduced by not driving an output buffer of a gamma voltage generator.

According to the present disclosure, there are effects of significantly increasing a driving time by optimizing power consumption.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
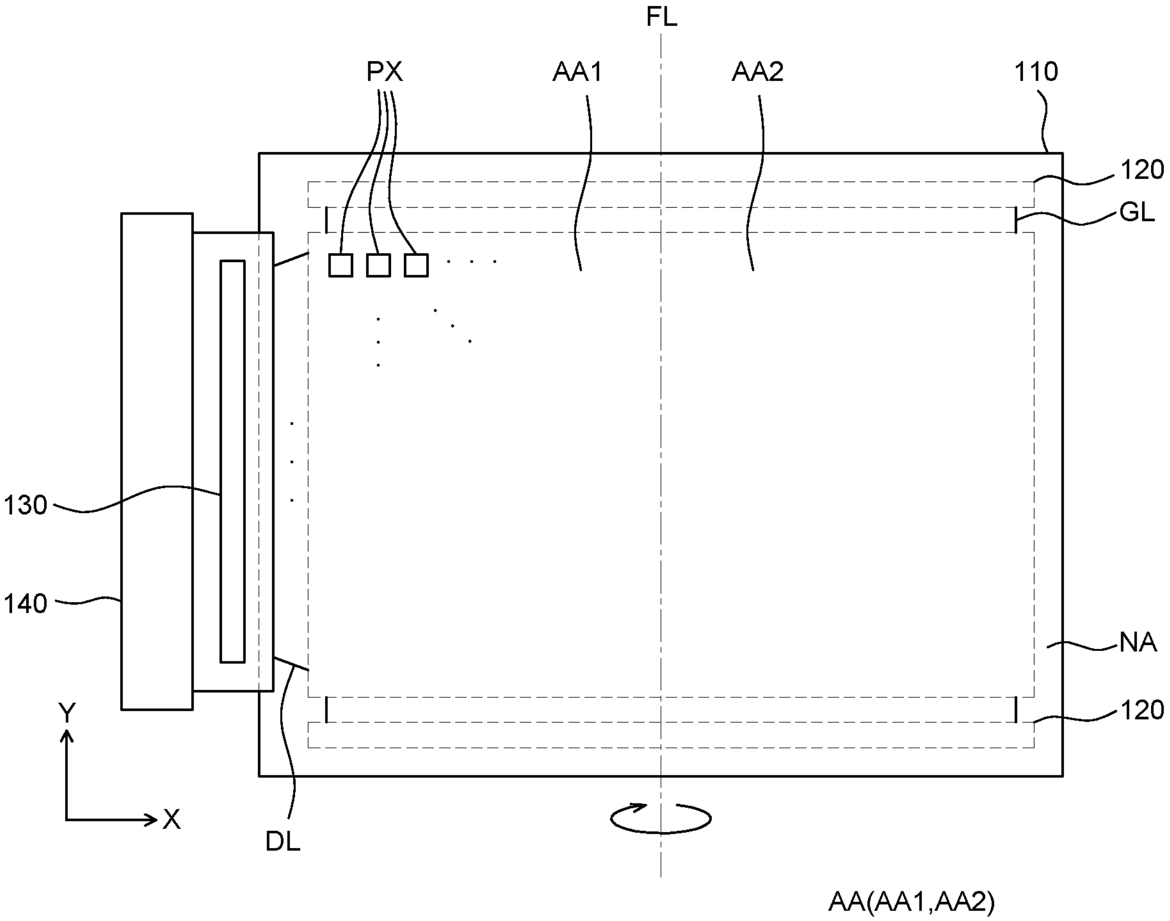
FIG. 1 is a view for explaining a foldable display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a foldable display device according to exemplary embodiments of the present disclosure will be described in detail with reference to accompanying drawings.

FIG. 1 is a view for explaining a foldable display device according to an exemplary embodiment of the present disclosure.

With reference to FIG. 1, a foldable display device 100 according to an exemplary embodiment of the present disclosure includes a display panel 110, a gate driving circuit 120, a data integrated circuit 130, and a printed circuit board 140.

On the display panel 110, a display area AA folded by a folding line FL and a non-display area NA surrounding the display area AA are disposed.

In addition, the display area AA may be folded by the folding line FL. Accordingly, the display area AA may be divided into a first display area AA1 and a second display area AA2 divided by the folding line FL. That is, a boundary between the first display area AA1 and the second display area AA2 may be the folding line FL.

Although not illustrated, the display area AA may be divided into a folding area that is folded with a specific radius of curvature when folded, and non-folding areas that extend to both sides of the folding area and are maintained in a flat state. That is, the non-folding areas may be defined with the folding area therebetween.

Meanwhile, FIG. 1 illustrates that sizes of the first display area AA1 and the second display area AA2 are equal to each other, but embodiments of the present disclosure are not limited thereto. The sizes of the first display area AA1 and the second display area AA2 may be configured to be different from each other, as needed.

In the display area AA, a plurality of gate lines GL and a plurality of data lines DL are disposed to cross each other in a matrix form. In addition, a plurality of pixels PX may be defined by the plurality of gate lines GL and the plurality of the data lines DL. Each of the plurality of pixels PX includes at least one thin film transistor.

Each of the plurality of pixels PX may include a red sub-pixel that emits red light, a green sub-pixel that emits green light, and a blue sub-pixel that emits blue light, but the present disclosure is not limited thereto.

In addition, in a case in which the foldable display device 100 according to an exemplary embodiment of the present disclosure is an organic light emitting display device, excitons are generated due to combination of electrons and holes emitted by applying a current to organic light emitting diodes provided in the plurality of pixels PX. In addition, the excitons emit light to implement gradation of the organic light emitting display device.

In this regard, the foldable display device 100 according to an exemplary embodiment of the present disclosure is not limited to an organic light emitting display device, and examples thereof may include various types of display device such as a liquid crystal display device, and the like.

Although not shown, touch electrodes for sensing a touch may be disposed in a matrix form on or inside the display panel 110 as needed in design. Accordingly, the foldable display device according to an exemplary embodiment of the present disclosure may sense a touch applied to the display panel 110 using the touch electrodes.

The touch sensing of the foldable display device 100 described above may be performed by a self-capacitive method of sensing self-capacitance of the touch electrode or by a mutual-capacitive method of sensing the touch through a change in mutual capacitance between a receiving touch electrode and a transmitting touch electrode.

The gate driving circuit 120 sequentially supplies a gate voltage to the gate lines GL.

The gate driving circuit 120 may be located, according to a driving method, only on one side of the display panel 110 or may be located on both sides of the display panel 110 in some cases. In addition, the gate driving circuit 120 may be implemented in a gate in panel (GIP) type and may be integrated in the display panel 110.

Specifically, in FIG. 1, the gate driving circuit 120 may be disposed on both sides of the display area AA based on a Y-axis direction and extend in an X-axis direction, on the display panel 110. In other words, since the folding line FL extends in the Y-axis direction, the gate driving circuit 120 may extend in a direction perpendicular to the folding line FL. However, the folding line FL only needs to be perpendicular to the gate driving circuit 120, but a position thereof is not limited to a central portion of the display panel 110 and may be variously changed according to design needs.

Meanwhile, the gate driving circuit 120 may include a shift register, a level shifter, and the like.

With reference to FIG. 1, the data integrated circuit 130 supplies a data voltage to the plurality of pixels disposed in the display area through the data lines DL.

The data integrated circuit 130 may be disposed on one side or both sides of the display panel 110 based on the X-axis direction, and extend in the Y-axis direction. In other words, since the folding line FL extends in the Y-axis direction, the data integrated circuit 130 may extend in a direction parallel to the folding line FL.

FIG. 1 illustrates that only one data integrated circuit 130 is disposed, but according to design needs, the data integrated circuit 130 may be divided into two or more data integrated circuits corresponding to the plurality of display areas AA.

Meanwhile, the data integrated circuit 130 is disposed on a base film formed of an insulating material. That is, in FIG. 1, the data integrated circuit 130 is illustrated as being mounted in the form of a COF (chip-on-film), but is not limited thereto. The data integrated circuit 130 may be mounted in the form of a COG (chip-on-glass), TCP (tape carrier package) or the like.

A controller such as an IC chip or a circuit unit may be mounted on the printed circuit board 140. In addition, a memory, a processor or the like may be mounted on the printed circuit board 140. The printed circuit board 140 is configured to transmit a signal for driving the display panel 110 from an external controller to the data integrated circuit 130.

Hereinafter, a concrete configuration and connection relationship of the data integrated circuit 130 will be specifically reviewed.

Figure 2:
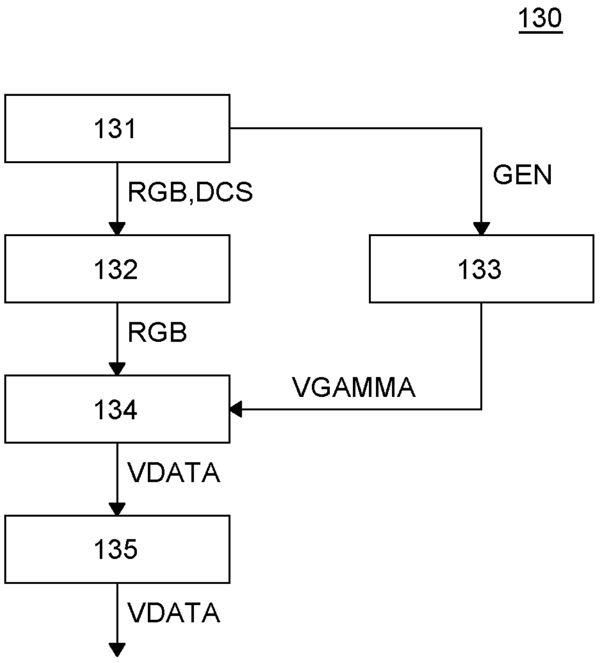
FIG. 2 is a block diagram for explaining a data integrated circuit of the foldable display device according to an exemplary embodiment of the present disclosure.

FIG. 2 is a block diagram for explaining a data integrated circuit of the foldable display device according to an exemplary embodiment of the present disclosure.

The data integrated circuit may include a timing controller 131, a data processor 132, a gamma voltage generator 133, a digital analog converter (DAC) 134, and an output unit 135.

The timing controller 131 converts, an image signal applied to an external host system, into a data signal format that can be processed by the data processor 132, based on a timing signal, thereby generating image data RGB.

To this end, the timing controller 131 receives various timing signals including a vertical synchronization signal (Vsync), a horizontal synchronization signal (Hsync), a data enable (DE) signal, a reference clock signal (CLK) and the like, together with the image signal, from the external host system.

In addition, the timing controller 131 supplies data control signals DCS to the data processor 132 and supplies gate control signals to the gate driving circuit 120.

Specifically, the timing controller 131 may output various data control signals (DCS) including a source start pulse (SSP), a source sampling clock (SSC), a source output enable signal (SOE) and the like, in order to control the data processor 132.

Here, the source start pulse controls a data sampling start timing of one or more data circuits constituting the data processor 132. The source sampling clock is a clock signal that controls a sampling timing of data in each data circuit. The source output enable signal (SOE) controls an output timing of the data processor 132.

In addition, the timing controller 131 outputs various gate control signals (GCS) including a gate start pulse (GSP), a gate shift clock (GSC), a gate output enable signal (GOE) and the like, in order to control the gate driving circuit 120.

Here, the gate start pulse controls an operation start timing of one or more gate circuits constituting the gate driving circuit 120. The gate shift clock is a clock signal commonly input to the one or more gate circuits, and controls a shift timing of a scan signal (gate pulse). The gate output enable signal specifies timing information of the one or more gate circuits.

The data processor 132 converts the image data RGB received from the timing controller 131 into data voltage VDATA in analog form and output it.

In addition, the data processor 132 may include various circuits such as a shift register, a plurality of latch units, and the like.

Specifically, in the data processor 132, the shift register shifts sampling signals according to the source sampling clock SSC of the data control signal DCS. In addition, the shift register generates a carry signal when data exceeding the number of latches of latch units is supplied.

The plurality of latch units sample the image data RGB from the timing controller 131 in response to the sampling signals sequentially input from the shift register, latch the image data RGB on a horizontal line by horizontal line basis, and then, simultaneously output the image data RGB of one horizontal line during a turn-on level period of the source output enable signal SOE.

The gamma voltage generator 133 subdivides a plurality of gamma reference voltages by the number of gradations that can be expressed by the number of bits of the image data RGB and generates gamma voltages VGAMMA corresponding to respective gradations.

And, the gamma voltage generator 133 determines whether or not to output the gamma voltage VGAMMA based on a gamma enable signal GEN applied from the timing controller 131.

The DAC 134 decodes, the image data RGB in digital form, input from the data processor 132, and outputs, the gamma voltage VGAMMA in analogue form, corresponding to a gray value of the image data RGB, as the data voltage VDATA.

The output unit 135 includes a plurality of buffers connected one-to-one to the data lines DL to reduce signal attenuation of the analog data voltage VDATA supplied from the DAC 134.

Through a series of processes described above, the data integrated circuit 130 of the foldable display device 100 according to an exemplary embodiment of the present disclosure may output the data voltage VDATA to the plurality of data lines DL.

Hereinafter, a configuration and an operation of the gamma voltage generator 133 will be described in detail with reference to FIG. 3.

Figure 3:
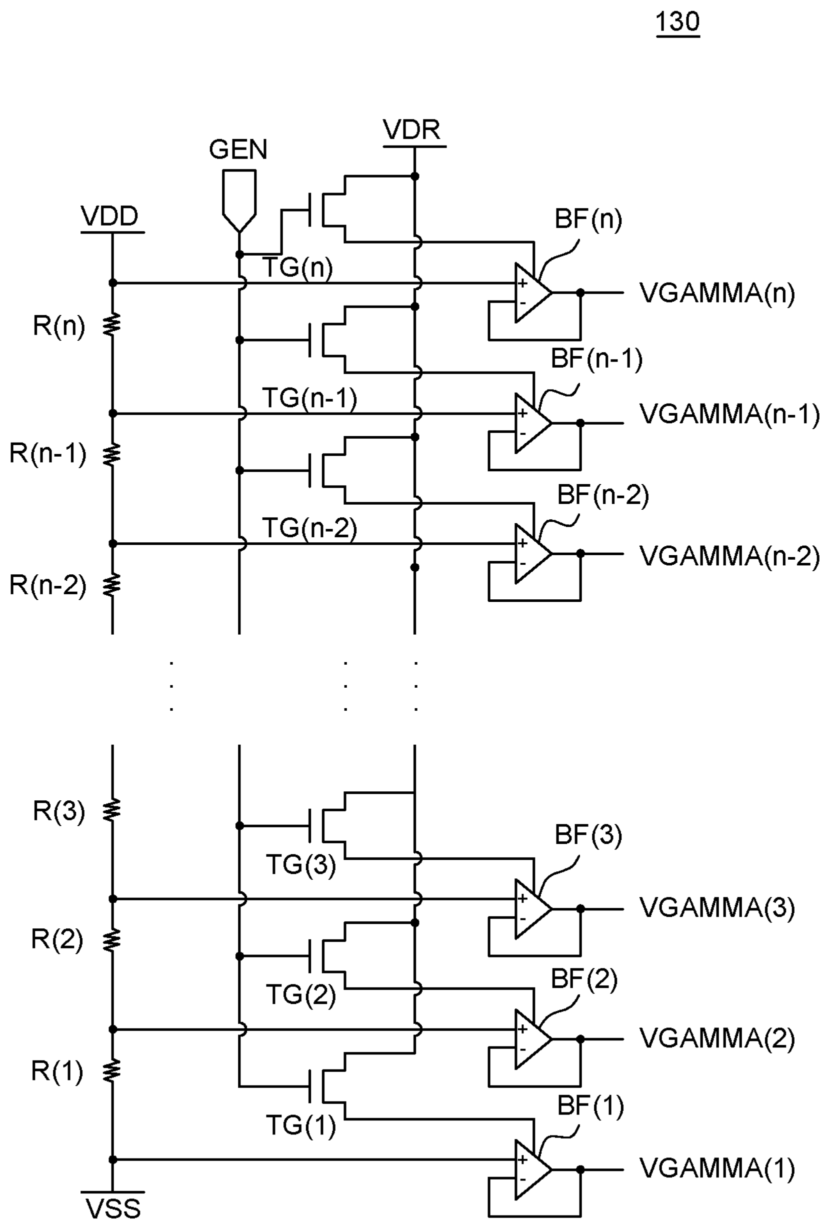
FIG. 3 is a circuit diagram for explaining a gamma voltage generator of the foldable display device according to an exemplary embodiment of the present disclosure.

FIG. 3 is a circuit diagram for explaining a gamma voltage generator of the foldable display device according to an exemplary embodiment of the present disclosure.

As illustrated in FIG. 3, the gamma voltage generator 133 includes a plurality of resistance strings R(1) to R(n) that divide gamma reference voltages VDD and VSS, a plurality of output buffers BF(1) to BF(n) that output the divided gamma voltages VGAMMA, and a plurality of buffer transistors TG(1) to TG(n) that control the plurality of output buffers BF(1) to BF(n).

The plurality of resistance strings R(1) to R(n) divide a high-potential gamma reference voltage VDD and a low-potential gamma reference voltage VSS, i.e. a difference between the high-potential gamma reference voltage VDD and the low-potential gamma reference voltage VSS, into respective gamma voltages VGAMMA(1) to VGAMMA(n).

Specifically, the plurality of resistance strings R(1) to R(n) may be composed of a first resistance string to an n-th resistance string R(1) to R(n) connected in series. Accordingly, the gamma voltages VGAMMA(1) to VGAMMA(n)

obtained by dividing the high-potential gamma reference voltage VDD and the low-potential gamma reference voltage VSS, i.e. the difference between the high-potential gamma reference voltage VDD and the low-potential gamma reference voltage VSS, at different ratios may be applied to respective nodes disposed between the plurality of resistance strings R(1) to R(n). Accordingly, the respective nodes disposed between the plurality of resistance strings R(1) to R(n) are connected to the respective output buffers BF(1) to BF(n) corresponding thereto, whereby a plurality of the gamma voltages VGAMMA(1) to VGAMMA(n) obtained by dividing the high-potential gamma reference voltage VDD and the low-potential gamma reference voltage VSS at different ratios may be applied to the plurality of output buffers BF(1) to BF(n).

And, the plurality of output buffers BF(1) to BF(n) stably output the plurality of the gamma voltages VGAMMA(1) to VGAMMA(n).

Accordingly, the respective nodes disposed between the plurality of resistance strings R(1) to R(n) are connected to respective input terminals of the plurality of output buffers BF(1) to BF(n), whereby the divided gamma voltages VGAMMA(1) to VGAMMA(n) may be output.

Specifically, the n-th output buffer BF(n) may be connected to one end of the n-th resistance string R(n). In addition, the (n−1)th output buffer BF(n−1) may be connected to the other end of the n-th resistance string R(n) and one end of the (n−1)th resistance string R(n−1). In addition, the (n−2)th output buffer BF(n−2) may be connected to the other end of the (n−1)th resistance string R(n−1) and one end of the (n−2)th resistance string R(n−2).

In addition, the respective input terminals of the plurality of output buffers BF(1) to BF(n) are connected to output terminals of the plurality of output buffers BF(1) to BF(n), so that the plurality of gamma voltages VGAMMA(1) to VGAMMA(n) may be fed back. Accordingly, the plurality of output buffers BF(1) to BF(n) can stably output the gamma voltages VGAMMA(1) to VGAMMA(n).

And, the plurality of buffer transistors TG(1) to TG(n) may control a driving of the output buffers BF(1) to BF(n).

That is, the plurality of respective buffer transistors TG(1) to TG(n) may supply a buffer driving voltage (VDR) to the output buffers BF(1) to BF(n) according to the gamma enable signal GEN applied from the timing control unit 131.

More specifically, in each of the plurality of buffer transistors TG(1) to TG(n), the gamma enable signal GEN is applied to a gate electrode of the buffer transistor, the buffer driving voltage VDR is applied to a first electrode of the buffer transistor, and an input power terminal of each of the plurality of output buffers BF(1) to BF(n) is connected to a second electrode of the buffer transistor.

Accordingly, when the gamma enable signal GEN is at a turn-on level, each of the plurality of buffer transistors TG(1) to TG(n) is turned on, so that the buffer driving voltage VDR may be applied to the input power terminal of each of the plurality of output buffers BF(1) to BF(n). Therefore, when the gamma enable signal GEN is at the turn-on level, the plurality of respective output buffers BF(1) to BF(n) output the gamma voltages VGAMMA(1) to VGAMMA(n).

On contrary to this, when the gamma enable signal GEN is at a turn-off level, each of the plurality of buffer transistors TG(1) to TG(n) is turned off, so that the buffer driving voltage VDR is not applied to the input power terminal of each of the plurality of output buffers BF(1) to BF(n). Therefore, when the gamma enable signal GEN is at the turn-off level, the plurality of respective output buffers BF(1) to BF(n) do not output the gamma voltages VGAMMA(1) to VGAMMA(n).

Accordingly, the foldable display device according to an exemplary embodiment of the present disclosure includes the buffer transistors TG(1) to TG(n) in the gamma voltage generator 133 to thereby control an output of the gamma voltage generator 133.

Hereinafter, driving operations when the foldable display device 100 according to an exemplary embodiment of the present disclosure is in a folded state and in an unfolded state will be described in detail with reference to FIGS. 4 to 5B. The timing controller 131 may be configured to drive the display panel 110 by supplying the signals RGB, DCS, GEN and so on as explained above in correspondence to the driving operations as explained below with reference to FIGS. 4 to 5B.

Figure 4:
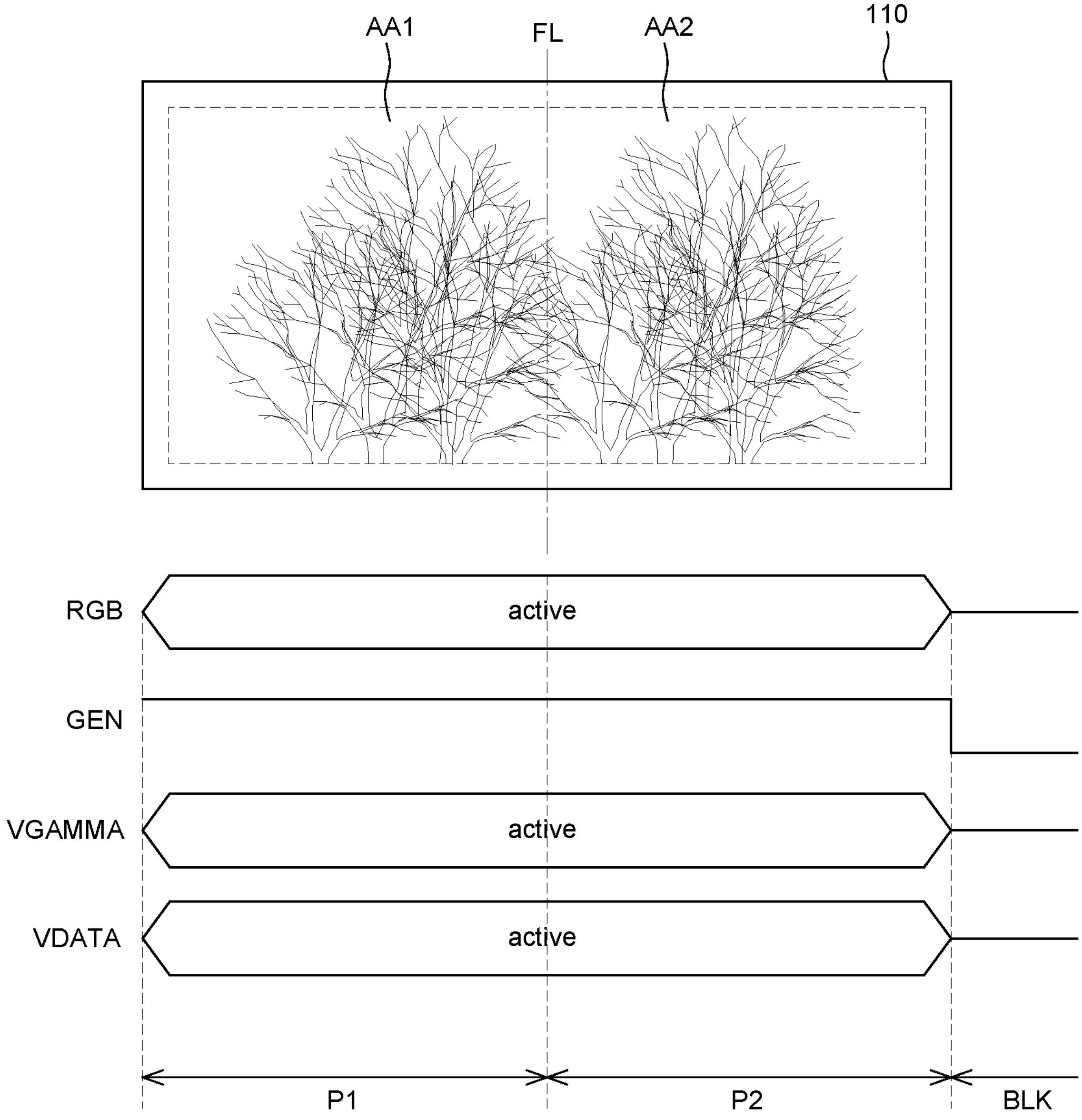
FIG. 4 is a diagram for explaining a driving operation when the foldable display device is in an unfolded state according to an embodiment of the present disclosure.

FIG. 4 is a diagram for explaining a driving operation when the foldable display device according to an embodiment of the present disclosure is in an unfolded state.

When the foldable display device according to an exemplary embodiment of the present disclosure is in an unfolded state, the display panel 110 may be fully driven. When the display panel 110 is fully driven, an image displayed on an area displayed in a first display area AA1 and an image displayed on a second display area AA2 implement one image as a whole.

To this end, when the foldable display device is in an unfolded state, it can be dividedly driven in a first period P1 and a second period P2. The first period P1 is a period in which the first display area AA1 is driven, and the second period P2 is a period in which the second display area AA2 is driven. In both the first period P1 and the second period P2, the image data RGB is supplied, and the gamma enable signal GEN is at the turn-on level.

Accordingly, in the first period P1 and the second period P2, the gamma voltage VGAMMA is output and by using this, the data voltage VDATA corresponding to the image data RGB is output.

Through a signal transmission process described above, when the foldable display device is in an unfolded state, the image displayed on the area displayed in the first display area AA1 and the image displayed on the second display area AA2 may implement one image as a whole.

However, in a blank period BLK which is a period between one frames consisting of the first period P1 and the second period P2, the image data RGB is not supplied, and the gamma enable signal GEN is at the turn-off level. Consequently, in the blank period BLK between the one frames, the gamma voltage VGAMMA is not output, and thus, the data voltage VDATA itself is not output.

Figure 5A:
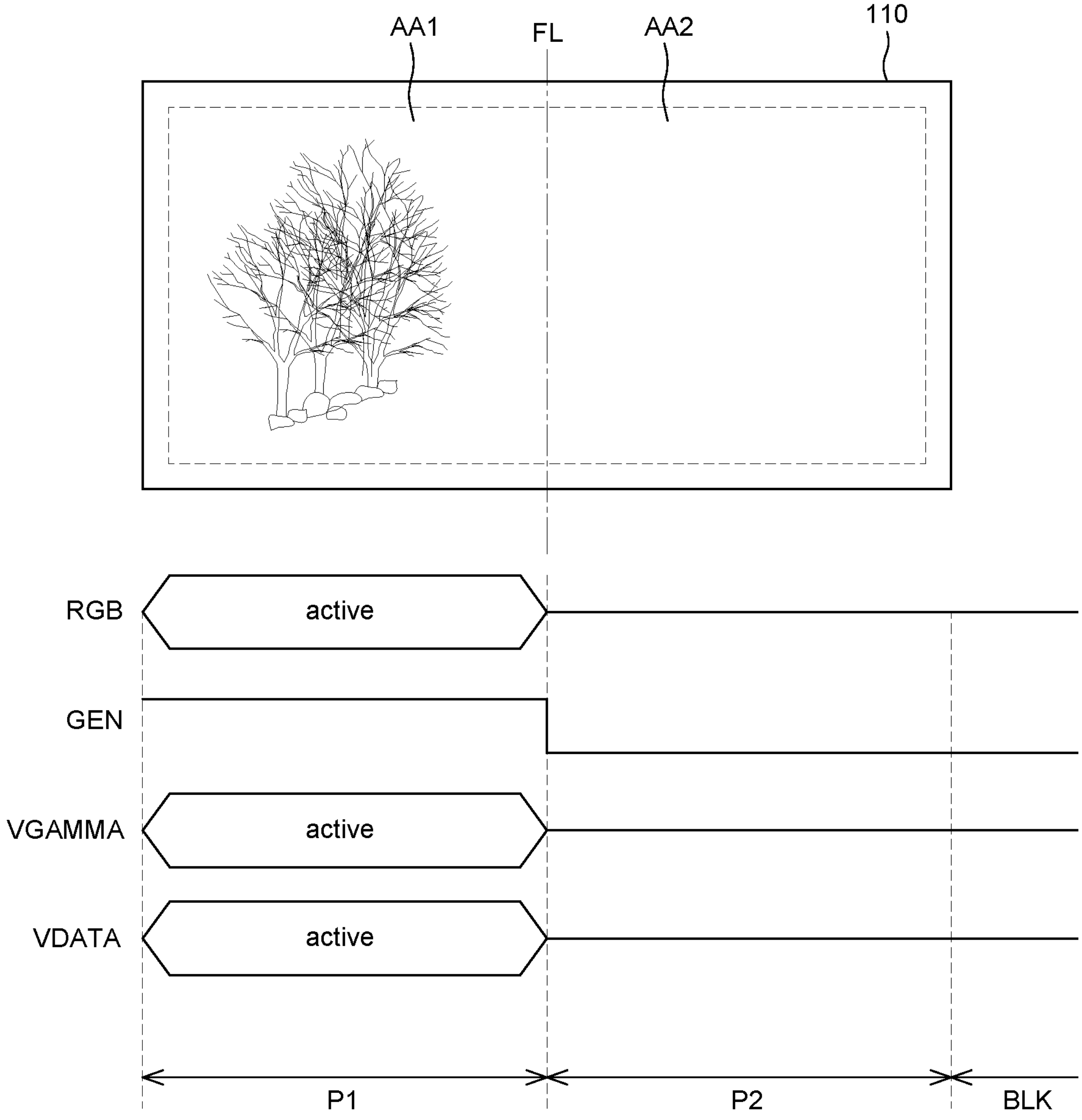
FIGS. 5A and 5B are diagrams for explaining driving operations when the foldable display device is in a folded state according to an exemplary embodiment of the present disclosure.
Figure 5B:
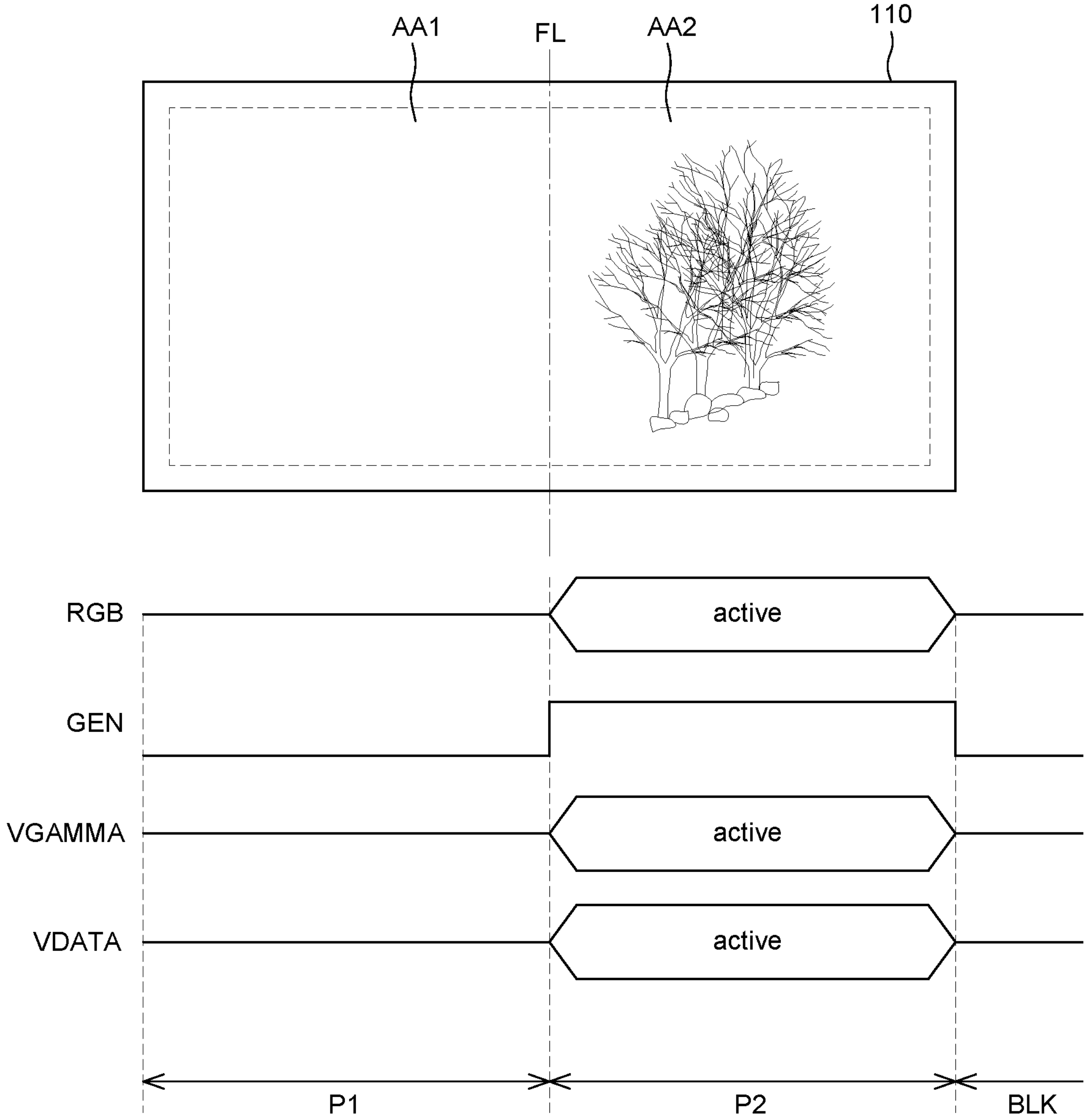

FIGS. 5A and 5B are diagrams for explaining driving operations when the foldable display device according to an exemplary embodiment of the present disclosure is in a folded state.

Specifically, FIG. 5A is a diagram for explaining a case in which only the first display area AA1 is driven in the foldable display device according to an exemplary embodiment of the present disclosure, and FIG. 5B is a diagram for explaining a case in which only the second display area AA2 is driven in the foldable display device according to an exemplary embodiment of the present disclosure.

When the foldable display device according to an exemplary embodiment of the present disclosure is in a folded state, the display panel 110 may be half-driven. When the display panel 110 is half-driven, the image displayed on the area displayed in the first display area AA1 is different from the image displayed on the second display area AA2.

That is, as illustrated in FIG. 5A, when the foldable display device is in a folded state, a normal screen may be implemented in the first display area AA1, but a black screen may be implemented in the second display area AA2. That is, in the case of FIG. 5A, the second display area AA2 cannot be seen by a user of the foldable display device and the first display area AA1 can be seen by a user.

To this end, when the foldable display device is in the folded state, the image data RGB is supplied and the gamma enable signal GEN is at the turned-on level in the first period P1 which is the period in which the first display area AA1 is driven.

Accordingly, in the first period P1, the gamma voltage VGAMMA is output, and by using this, the data voltage VDATA corresponding to the image data RGB is output.

On the other hand, in the second period P2 which is the period in which the second display area is driven, the image data RGB is not supplied and the gamma enable signal GEN is at the turn-off level. Consequently, in the second period P2, the gamma voltage VGAMMA is not output and thus, the data voltage VDATA itself is not output.

Through a signal transmission process described above, when the foldable display device is in the folded state, an image may be implemented in an area displayed in the first display area AA1, but in the second display area AA2, an image is not implemented, instead, a black screen can be implemented.

However, even when the foldable display device is in the folded state, in the blank period BLK which is a period between the one frames consisting of the first period P1 and the second period P2, the image data RGB is not supplied and the gamma enable signal GEN is at the turn-off level. Accordingly, in the blank period BLK between the one frames, the gamma voltage VGAMMA is not output and thus, the data voltage VDATA itself is not output.

In another situation, when the foldable display device is in the folded state as illustrated in FIG. 5B, a normal screen may be implemented in the second display area AA2, but a black screen may be implemented in the first display area AA1.

To this end, when the display device is in the folded state, in the first period P1 which is the period in which the first display area AA1 is driven, the image data RGB is not supplied and the gamma enable signal GEN is at the turn-off level. Accordingly, in the first period P1, the gamma voltage VGAMMA is not output and thus, the data voltage VDATA itself is not output.

On contrary to this, in the second period P2 which is the period in which the second display area is driven, the image data RGB is supplied and the gamma enable signal GEN is at the turn-on level.

Consequently, in the second period P2, the gamma voltage VGAMMA is output and by using this, the data voltage VDATA corresponding to the image data RGB is output.

Through a signal transmission process described above, when the foldable display device is in the folded state, an image may be implemented in an area displayed in the second display area AA2, but in the first display area AA1, an image is not implemented, instead, a black screen may be implemented.

However, even when the foldable display device is in the folded state, in the blank period BLK which is the period between the one frames consisting of the first period P1 and the second period P2, the image data RGB is not supplied and the gamma enable signal GEN is at the turn-off level. Accordingly, in the blank period BLK between the one frames, the gamma voltage VGAMMA is not output and thus, the data voltage VDATA itself is not output.

Figure 6:
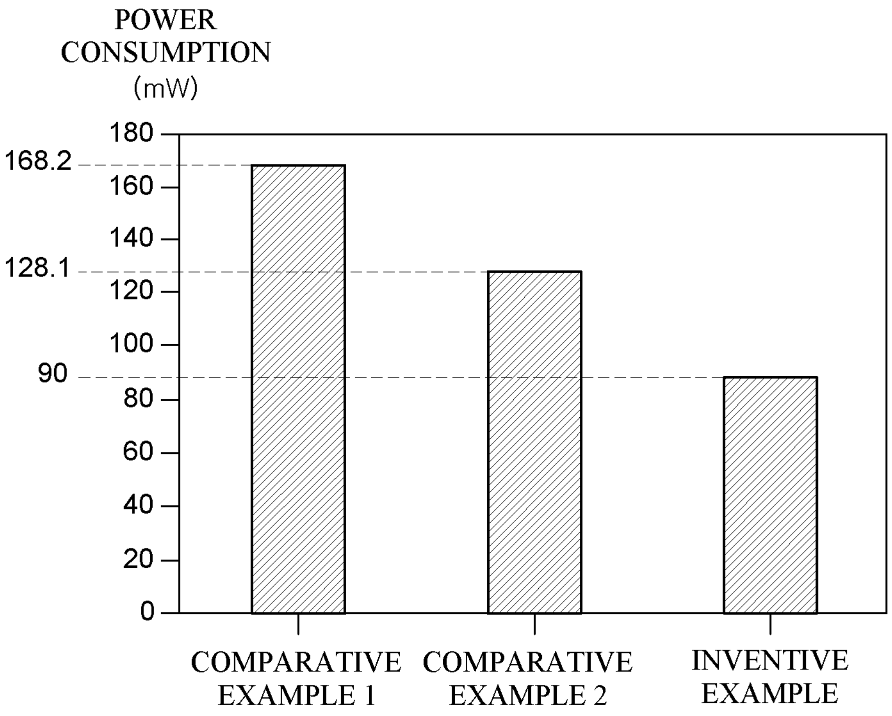
FIG. 6 is a diagram for explaining power consumption of a foldable display device according to an Inventive Example of the present disclosure.

FIG. 6 is a diagram for explaining power consumption of a foldable display device according to an Inventive Example of the present disclosure.

In FIG. 6, Comparative Example 1 refers to a case in which a foldable display device according to the prior art is in an unfolded state and thus, full driving is performed. Comparative Example 2 refers to a case in which a foldable display device according to the prior art is in a folded state and thus, half driving is performed. That is, as described above, Comparative Example 1 and Comparative Example 2 mean cases in which the gamma voltage generator outputs the gamma voltage regardless of whether or not the foldable display device is folded.

On the other hand, in the case of the foldable display device according to the Inventive Example of the present disclosure as described above, when the foldable display device is in a folded state and thus, half driving is performed, the gamma voltage generator 133 does not output the gamma voltage VGAMMA in any one of the first period P1 or the second period P2.

Specifically, as shown in FIG. 6, 168.2 mW of power was consumed in Comparative Example 1, and 128.1 mW of power was consumed in Comparative Example 2.

In this regard, in Comparative Example 2, a plurality of pixels disposed in any one of the first display area or the second display area did not emit light, so power consumption was reduced by 24%, as compared to Comparative Example 1.

In comparison with these, when the foldable display device according to the Inventive Example of the present disclosure is in a folded state, it was measured that 90 mW of power was consumed.

In this regard, in the case of half driving of the foldable display device according to the Inventive Example of the present disclosure, the gamma voltage generator 133 did not output the gamma voltage VGAMMA in any one of the first period P1 or the second period P2, so that power consumption was reduced by 21.4% as compared to Comparative Example 2.

That is, when the foldable display device according to an exemplary embodiment of the present disclosure drives a non-display area, power consumption can be significantly reduced by not driving the output buffers BF(1) to BF(n) of the gamma voltage generator 133.

Accordingly, there are effects of significantly increasing a driving time of the foldable display device by optimizing power consumption.

The exemplary embodiments of the present disclosure can also be described as follows:

According to an aspect of the present disclosure, a foldable display device includes a display panel including a plurality of display areas divided by a folding line; and a data integrated circuit outputting a data voltage to the plurality of display areas, wherein the data integrated circuit includes a timing controller outputting a gamma enable signal; a data processor processing an image data; a gamma voltage generator determining whether or not to output a plurality of gamma voltages according to the gamma enable signal; and a digital analog converter (DAC) outputting the gamma voltage, as the data voltage corresponding to a gray value of the image data.

The gamma voltage generator may include a plurality of resistance strings setting the plurality of gamma voltages by dividing a gamma reference voltage; a plurality of output buffers outputting the plurality of gamma voltages; and a plurality of buffer transistors controlling the plurality of output buffers.

Each of the plurality of buffer transistors may include a gate electrode to which the gamma enable signal is applied; a first electrode to which a buffer driving voltage is applied; and a second electrode connected to a voltage supply terminal of each of the plurality of output buffers.

The display panel may be dividedly driven in a first period in which a first display area is driven and a second period in which a second display area is driven.

The first period and the second period may constitute one frame.

A blank period may be inserted between the one frame and the one frame.

The gamma enable signal may be at a turn-off level in the blank period.

When the display panel is in a folded state, the gamma enable signal may be at a turn-on level in the first period and may be at a turn-off level only in the second period.

In the first period, the plurality of gamma voltages may be output, and in the second section, the plurality of gamma voltages are not output.

When the display panel is in a folded state, the gamma enable signal may be at a turn-off level in the first period and may be at a turn-on level only in the second period.

In the first period, the plurality of gamma voltages may be not output, and in the second section, the plurality of gamma voltages may be output.

when the display panel is in an unfolded state, the gamma enable signal may be at a turn-on level in the first period and the second period.

According to a further aspect of the present disclosure a driving method for a foldable dis-play device as disclosed above is provided, the driving method comprising: dividedly drive the display panel in a first period in which a first display area is driven and a second period in which a second display area is driven; wherein, when the display panel is in a folded state, outputting the gamma enable signal at a turn-on level in one of the first period and the second period and outputting the gamma enable signal at a turn-off level in the other one of the first period and the second period.

The gamma voltage generator may output the plurality of gamma voltages according to the gamma enable signal in one of the first period and the second period.

The gamma enable signal may be output at a turn-on level in one of the first period and the second period in the folded state based on which one of the first display area and the second display area is viewable by a user.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A foldable display device, comprising:

a display panel including a plurality of display areas divided by a folding line; and a data integrated circuit outputting a data voltage to the plurality of display areas, wherein the data integrated circuit includes:

a timing controller outputting a gamma enable signal;

a data processor processing an image data;

a gamma voltage generator determining whether or not to output a plurality of gamma voltages according to the gamma enable signal; and a digital analog converter (DAC) outputting the gamma voltage, as the data voltage corresponding to a gray value of the image data;

wherein the gamma voltage generator includes:

a plurality of resistance strings setting the plurality of gamma voltages by dividing a gamma reference voltage;

a plurality of output buffers outputting the plurality of gamma voltages; and a plurality of buffer transistors controlling the plurality of output buffers, wherein each of the plurality of buffer transistors includes:

a gate electrode to which the gamma enable signal is applied;

a first electrode to which a buffer driving voltage is applied; and a second electrode connected to a voltage supply terminal of each of the plurality of output buffers.

2. The foldable display device of claim 1, wherein the display panel is dividedly driven in a first period in which a first display area is driven and a second period in which a second display area is driven.

3. The foldable display device of claim 2, wherein the first period and the second period constitute one frame, and a blank period is inserted between the one frame and the one frame.

4. The foldable display device of claim 3, wherein the gamma enable signal is at a turn-off level in the blank period.

5. The foldable display device of claim 2, wherein when the display panel is in a folded state, the gamma enable signal is at a turn-on level in the first period and is at a turn-off level in the second period.

6. The foldable display device of claim 5, wherein in the first period, the plurality of gamma voltages are output, and in the second period, the plurality of gamma voltages are not output.

7. The foldable display device of claim 2, wherein when the display panel is in a folded state, the gamma enable signal is at a turn-off level in the first period and is at a turn-on level only in the second period.

8. The foldable display device of claim 7, wherein in the first period, the plurality of gamma voltages are not output, and in the second period, the plurality of gamma voltages are output.

9. The foldable display device of claim 3, wherein when the display panel is in an unfolded state, the gamma enable signal is at a turn-on level in the first period and the second period.

10. The foldable display device of claim 1, wherein the plurality of resistance strings are configured to divide a difference between a high-potential gamma reference voltage and a low-potential gamma reference voltage into respective gamma voltages (VGAMMA) of the plurality of gamma voltages.

11. A foldable display device, comprising:

a display panel dividedly driven in a first period in which a first display area is driven and a second period in which a second display area is driven; and a data integrated circuit outputting a data voltage to the first display area and the second display area and including a gamma voltage generator, wherein when the display panel is in a folded state, the gamma voltage generator outputs a plurality of gamma voltages according to a gamma enable signal in one of the first period and the second period, wherein the gamma voltage generator includes:

a plurality of resistance strings setting the plurality of gamma voltages by dividing a gamma reference voltage;

a plurality of output buffers outputting the plurality of gamma voltages; and a plurality of buffer transistors applying a buffer driving voltage to the plurality of output buffers according to the gamma enable signal.

12. The foldable display device of claim 11, wherein when the display panel is in a folded state, the gamma enable signal is at a turn-off level so that the plurality of buffer transistors do not apply the buffer driving voltage in the other of the first period and the second period.

13. A driving method for a foldable display device according to any one of the preceding claims, the driving method comprising:

selectively drive the display panel in a first period in which a first display area is driven and a second period in which a second display area is driven;

wherein, when the display panel is in a folded state, outputting the gamma enable signal at a turn-on level in one of the first period and the second period and outputting the gamma enable signal at a turn-off level in the other one of the first period and the second period.

14. The driving method of claim 13, wherein the gamma voltage generator outputs the plurality of gamma voltages according to the gamma enable signal in one of the first period and the second period.

15. The driving method of claim 13, wherein the gamma enable signal is output at a turn-on level in one of the first period and the second period in the folded state based on which one of the first display area and the second display area is viewable by a user.

* * * * *